United States Patent
Uchida et al.

(10) Patent No.: US 7,010,653 B2
(45) Date of Patent: Mar. 7, 2006

(54) DATA STORAGE DEVICE, COMMAND QUEUE RE-ORDERING METHOD, AND DATA PROCESSING METHOD AND PROGRAM

(75) Inventors: Hiroshi Uchida, Kanagawa-ken (JP); Tetsuo Semba, Kanagawa-ken (JP); Tomoyuki Oyama, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 337 days.

(21) Appl. No.: 10/405,523

(22) Filed: Apr. 2, 2003

(65) Prior Publication Data

US 2003/0225969 A1 Dec. 4, 2003

(30) Foreign Application Priority Data

Apr. 3, 2002 (JP) ............................ 2002-101895

(51) Int. Cl.
*G06F 13/14* (2006.01)
(52) U.S. Cl. ..................... 711/158; 711/111; 711/112; 711/151; 711/167
(58) Field of Classification Search ................ 711/4, 711/112, 111, 151, 155, 167, 114, 150, 158
See application file for complete search history.

(56) References Cited

U.S. PATENT DOCUMENTS

| 4,899,234 | A | | 2/1990 | Genheimer |
| 5,548,795 | A | * | 8/1996 | Au ............................ 710/52 |
| 5,570,332 | A | | 10/1996 | Heath et al. |
| 5,729,718 | A | | 3/1998 | Au |
| 6,145,052 | A | | 11/2000 | Howe et al. |
| 6,571,298 | B1 | * | 5/2003 | Megiddo ....................... 710/5 |
| 6,804,751 | B1 | * | 10/2004 | Espeseth et al. ............ 711/158 |

FOREIGN PATENT DOCUMENTS

JP 05-134810 1/1993

* cited by examiner

*Primary Examiner*—T Nguyen
(74) *Attorney, Agent, or Firm*—Robert B. Martin; Dillon & Yudell LLP

(57) ABSTRACT

A method and system to provide a command queue re-ordering method that can make the power save and reduction in acoustic noise. The command queue re-ordering method involves calculating the value of an evaluation function, $Ev = A \times T + (1-A) \times Fun(L)$ (A is any number from 0 to 1, T is a latency required to execute a write command and/or read command, and Fun(L) is an evaluation function with a seek distance L) for the write command and/or read command, and selecting the write command and/or read command having the minimum value as a next command to be execute.

12 Claims, 10 Drawing Sheets

| Command occupancy ratio | Weight parameter A | |
|---|---|---|
| 30% or less | 0.2 | * Power save and reduction in acoustic noise with priority |
| 50% or less | 0.4 | |
| 70% or less | 0.6 | |
| 90% or less | 0.8 | |
| Beyond 90% | 1.0 | * Performance with highest priority |

DATA STORAGE DEVICE, COMMAND QUEUE RE-ORDERING METHOD, AND DATA PROCESSING METHOD AND PROGRAM

This application claims the priority of Japanese Patent No. JP2002-101895 (IBM Docket No. JP920020024JP1), filed on Apr. 3, 2002, and entitled "Data Storage Device, Command Queue Re-Ordering Method, and Data Processing Method and Program."

BACKGROUND OF THE INVENTION

1. Technical Field

The present invention relates to a disk drive unit, and more particularly to a method for re-ordering a command queue in writing or reading the data.

2. Description of the Related Art

A hard disk drive is one of the most popular external data storage devices for the computer. The hard disk drive has a magnetic head for reading the data stored in a magnetic disk, or writing the data into the magnetic disk. This magnetic head is mounted on an actuator mechanism that is driven by a VCM (Voice Coil Motor).

When reading or writing the data on the magnetic disk, the magnetic head is moved to a certain track and positioned by driving the actuator mechanism. The magnetic head is controlled to be moved to a certain position on the basis of the servo information stored in the magnetic disk.

The reading or writing of data is performed in accordance with a write command and a read command transferred from a host system. The hard disk drive re-orders a command queue as one of the performance improving techniques. That is, the command queue of write commands and read commands transferred sequentially from the host system is re-ordered so that the latency required to execute the writing or reading command may be minimized.

Various methods for re-ordering the command queue in the hard disk drive have been already offered. They are roughly classified into a method for improving the I/O throughput (amount of work performed over a period of time) and a method for preventing the time-out of command caused by re-ordering the command. And the method for improving the I/O throughput is further classified into a case where the seek time is longer than the rotational latency and a case where the seek time is almost equivalent to the rotational latency.

The method for improving the I/O throughput in the case where the seek time is longer than the rotational latency was employed in the hard disk drive or optical storage device in the past, and fundamentally involves selecting a command having the least seek time. Herein, the rotational latency is sufficiently shorter than the seek time, and thus ignored. Most of the methods use the seek distance instead of the seek time in relative length. The method called an SSTF (shortest Seek Time First) involves selecting a command having exactly the shortest seek time in the command queue. However, this method has a drawback that the seek distance is longer on the outer and inner circumference of the disk. The method for re-ordering the command queue using the cylinder number to resolve this drawback is called a SCAN method. These methods were described in Teorey and Pinkerton, "A comparative Analysis of Disk Scheduling Politics", Comm. ACM. Vol. 15, No. 3, March 1972, pp. 177–184, Geist and Daniel, "A continuum of Disk Scheduling Algorithms", ACM Trans. On Computer Systems, Vol. 5, No. 1, February 1987, pp. 77–92, and Denning, "Effects of Scheduling on File Memory Operations", American Federation of Information Processing Societies (AFIPS) Joint Computer Conference Proceedings, Vol. 30, 1967, pp. 9–21.

Though the actual seek time and rotational latency should be considered, these methods use the seek distance and have the low degree of optimization.

As the seek time is shortened to the point that the seek time and the rotational latency may be equivalent in the time scale, the rotational latency can not be ignored. Thus, a method for reducing the rotational latency employing the cylinder number and the rotation angle (number) was disclosed in U.S. Pat. No. 5,570,332. Also, a method for re-ordering the commands in consideration of the seek time plus rotational latency to choose an executable command of the shortest time including the rotational latency was disclosed in U.S. Pat. No. 5,729,718. With this method, the latency (essentially, seek time+rotational latency) is calculated in consideration of the seek time, the rotational latency and the head change.

On the other hand, the methods for preventing the time-out of command were offered in Published Unexamined Patent Application No. 05-134810 (Fujitsu) and U.S. Pat. No. 6,145,052.

In using the hard disk drive, there is a request for taking preference of the power save and reduction in acoustic noise over its performance.

The conventional methods for the power save or reduction in acoustic noise involve JIT (Just In Time seek technology) by Seagate in United States, and delaying the seek time by an amount of rotational latency to make the power save and reduction in acoustic noise and enhance the performance consistently as disclosed in U.S. Pat. No. 4,899,234. Some methods involve directly the seek operation by switching the seek method (including the servo parameters) between a performance mode and a silent mode. These methods are very effective but required to have the parameters for the servo system duplicated, and therefore have a significant drawback of taking a great burden on the development because it must be checked that the seek is normally made for all combinations of the seek distance and the latency.

SUMMARY OF THE INVENTION

It is an object of the present invention to provide a method for re-ordering a command queue (queue of commands to be re-ordered and selected) to save power and to reduce acoustic noise. More particularly, it is another object of the invention to provide a method for enabling a user to select a condition from a range for an optimal state of performance for saving power and reducing acoustic noise depending on a disk storage device's service situation and environment.

Also, it is another object of the invention to change automatically the condition in the range from the optimal state of performance to the state with the power save and reduction in acoustic noise (or conversely) without aggravating the command response time to the user.

A feature of the present invention is that an evaluation function of command that is the reference for re-ordering the command queue is not only a latency evaluation function but also a sum of evaluation functions of power (power consumption) and acoustic noise that consist of a function of seek distance, whereby it is possible to make the power save and reduction in acoustic noise while suppressing a degradation in performance.

Usually, the method for re-ordering the command queue is optimized for the performance, and thus chooses a command of the shortest latency $T$. Namely, the evaluation function Ev of command that is the reference for re-ordering the command queue is given by Ev=T, where the latency T is a sum of the time taken for head change, the seek time and the rotational latency.

The power and acoustic noise in making the seek operation of the head in the data storage device typically tend to increase as the seek distance is longer. Thus, this invention involves employing the method for re-ordering the command queue to make it difficult to choose a long distance seek that takes more power and produces louder acoustic noise, thereby optimizing the performance while making the power save and reduction in acoustic noise. If the long distance seek beyond a certain length is not to be chosen, the command may not be selected in some cases, or the performance may be greatly degraded. Therefore, this invention employs the evaluation function of command in view of the evaluation function of power and acoustic noise that consists of a function of seek distance, making it difficult to choose the long distance seek, and thereby achieves the power save and reduction in acoustic noise while suppressing a degradation in performance.

To optimize not only the performance but also the power save and reduction in acoustic noise, this invention proposes that the evaluation function Ev of command that is the reference for re-ordering the command queue is composed of the latency T and the evaluation function Fun(L) of power and acoustic noise as a function of seek distance L as shown in an example below:

$$Ev=A \times T+(1-A) \times \mathrm{Fun}(L)$$

The latency T is a sum of the time taken for head change, the seek time and the rotational latency, and may involve a rotational latency of one revolution with a probability of missed revolution. The probability of missed revolution is the probability of waiting for one revolution because the seek operation is ended but the writing/reading operation is not normally performed due to vibration of the head, and is a function of the rotational latency, the seek distance, and the writing/reading mode. The evaluation function Fun(L) of power and acoustic noise is an increasing function along with the seek distance. The parameter A is a weight determined by the user at will. The parameter A is selected from 0 to 1.

A selection criterion for command is that the calculated value of the evaluation function for command is at minimum. Therefore, the command of longer seek distance even with shorter latency T is more difficult to be selected by virtue of the increasing function Fun(L) of seek distance L. Thereby, the frequency of long distance seek that takes more power and produces louder acoustic noise can be reduced. In particular, if the weight parameter A is zero, the frequency of long distance seek can be greatly reduced to achieve the power save and reduction in acoustic noise, because the commands are re-ordered to make the shortest seek. Conversely, if the weight parameter A is one, the conventional re-ordering method to attain the highest performance is equivalently employed, because the commands are re-ordered to have the least latency. The user chooses the weight parameter A at will to select a condition in a range from the optimal state of performance with the power save and reduction in acoustic noise to the state of the highest performance.

Some of the data storage devices involve a different seek control method depending on the seek distance to produce an extremely quiet acoustic noise in seeking over a certain distance L1 or less. In such a case, the function Fun(L) is defined as $$\mathrm{Fun}(L)=B \times (L-L1);$$

where L>L1; B is a positive integer, or $$\mathrm{Fun}(L)=0;$$

when L≦L1

In this manner, it is difficult to select the command of seek distance L beyond L1 to reduce the acoustic noise remarkably.

Also, this invention proposes a method for automatically selecting a condition in a range from the optimal state of performance to the state with the power save and reduction in acoustic noise (or conversely). This proposal assesses the use situation of the data storage device, employing the depth of command queue and the occupancy rate of execution waiting command in the queue, and gives the parameter A, employing a relation table between the command response time (average time) and the parameter A that is chosen so that the command response time (average value) for the user may not be degraded. Alternatively, the parameter A may be interpolated on the basis of this table.

The data storage device demands the highest performance when the commands in the command queue are always filled to the depth of queue. Conversely, in a situation where the queue occupancy rate of command is low, the time (command response time) since the system (e.g., computer system) issues the command until the command is executed and its response is returned is shorter than the queue occupancy rate of command is short, so that the data storage device can make a sufficiently rapid response to the user even though the data storage device is more or less degraded in performance. The average time since the system (user) issues the command until its response is returned is typically increased as the queue is longer, because any other command in the queue must be executed.

In this manner, the method estimates the command response time, using the depth of command queue and the occupancy rate of command in the queue, and automatically selects a condition according to these values in the range from the optimal state of performance to the state with power save and reduction in acoustic noise (or conversely) to achieve the power save and reduction in acoustic noise without degrading the performance of the system (command response time (average time) for the user).

Based on the above items, the present invention provides a data storage device comprising a read/write head for making a writing process or a reading process in accordance with a write command or a read command transferred from the outside, a disk storage medium into which the write data is written through the writing process of the read/write head and from which the read data is read through the reading process, order holding means for holding the writing order and/or reading order of the write command or read command into or from the disk storage medium, and order deciding means for deciding the writing order and/or reading order in the order holding means on the basis of the result of applying a predetermined weight on a latency required to execute the write command or read command from a current position of the read/write head and a seek distance of the read/write head.

The data storage device of the invention further comprises a weighting setting function for allowing the user to set the weighting.

In the data storage device of the invention, the order deciding means changes the weighting dynamically on the basis of an occupancy rate of the write command or read command in the order holding means.

In the data storage device of the invention, the order deciding means extracts a predetermined number of commands from among the write commands and/or read commands held in the order holding means and decides the writing and/or reading order for the extracted write commands and/or read commands. The order deciding means extracts the predetermined number of commands in the order in which the latency required to execute the write command and/or read command is shorter, for example.

In deciding the writing and/or reading order in the order holding means on the basis of the latency required to execute the write command or read command from the current position of the read/write head and the seek distance of the read/write head, it is effective to employ the evaluation function $Ev = A \times T + (1-A) \times Fun(L)$ as previously described. This invention provides a method for re-ordering a command queue employing this evaluation function. This method is a command queue re-ordering method for re-ordering the write commands and/or read commands queued in a command queue of a data storage device having a disk storage medium, comprising a step of calculating the value of the evaluation function, $Ev = A \times T + (1-A) \times Fun(L)$ (where A is any number from 0 to 1, T is a latency required to execute a write command and/or read command, and $Fun(L)$ is the evaluation function using a seek distance L) for the write command and/or read command, and a step of selecting the write command and/or read command in which the evaluation function Ev is at minimum as a next command to be executed.

In this invention, it is effective that the evaluation function $Fun(L)$ is an increasing function in which the value increases as the seek distance L is longer.

In the re-ordering method of the invention, the parameter A for the evaluation function Ev can be dynamically changed in accordance with the occupancy rate in the command queue. More specifically, the parameter A is set to be relatively large, when the occupancy rate of the write command and/or read command in the command queue is relatively large, thereby making it possible to take preference of the performance in the data storage device. Also, the parameter A is set to be relatively small when the occupancy rate is relatively small, thereby making it possible to take preference of the power save and reduction in acoustic noise.

Also, this invention provides a data processing method for executing a read command and/or a write command transferred from a host via a read/write head on a storage medium, comprising selecting a next read command and/or write command to be executed from among the read commands and/or write commands on the basis of the result of applying a weight on a latency required to execute the write command or read command from a current position of the read/write head and a seek distance from the current position of the read/write head, and reading the data from the storage medium or writing the data into the storage medium on the basis of the selected read command and/or write command.

The weighting can be set by the user, but is changed during the data processing. For example, a next read command and/or write command to be executed can be selected by changing the weighting dynamically depending on a situation where the read command and/or write command is transferred from the host.

This invention provides a program for performing the data storage method. Also, the power taken to move the read/write head and the acoustic noise are associated with the seek distance. That is, the power and acoustic noise can be taken into consideration by considering the seek distance. Accordingly, the program of the invention comprises causing the data storage device to execute a step of selecting a next read command and/or write command to be executed from among the read commands and/or write commands in consideration of an electric power consumed by the movement of the read/write head or a sound produced by the movement of the read/write head in addition to an access time from a current position of the read/write head, and a step of reading the data from the storage medium or writing the data into the storage medium on the basis of the selected read command and/or write command.

This program may further comprise a procedure of setting up the access time and a priority for the electric power consumed by the movement of the read/write head or the acoustic noise produced by the movement of the read/write head.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, where:

DETAILED DESCRIPTION OF A PREFERRED EMBODIMENT

Figure 1:
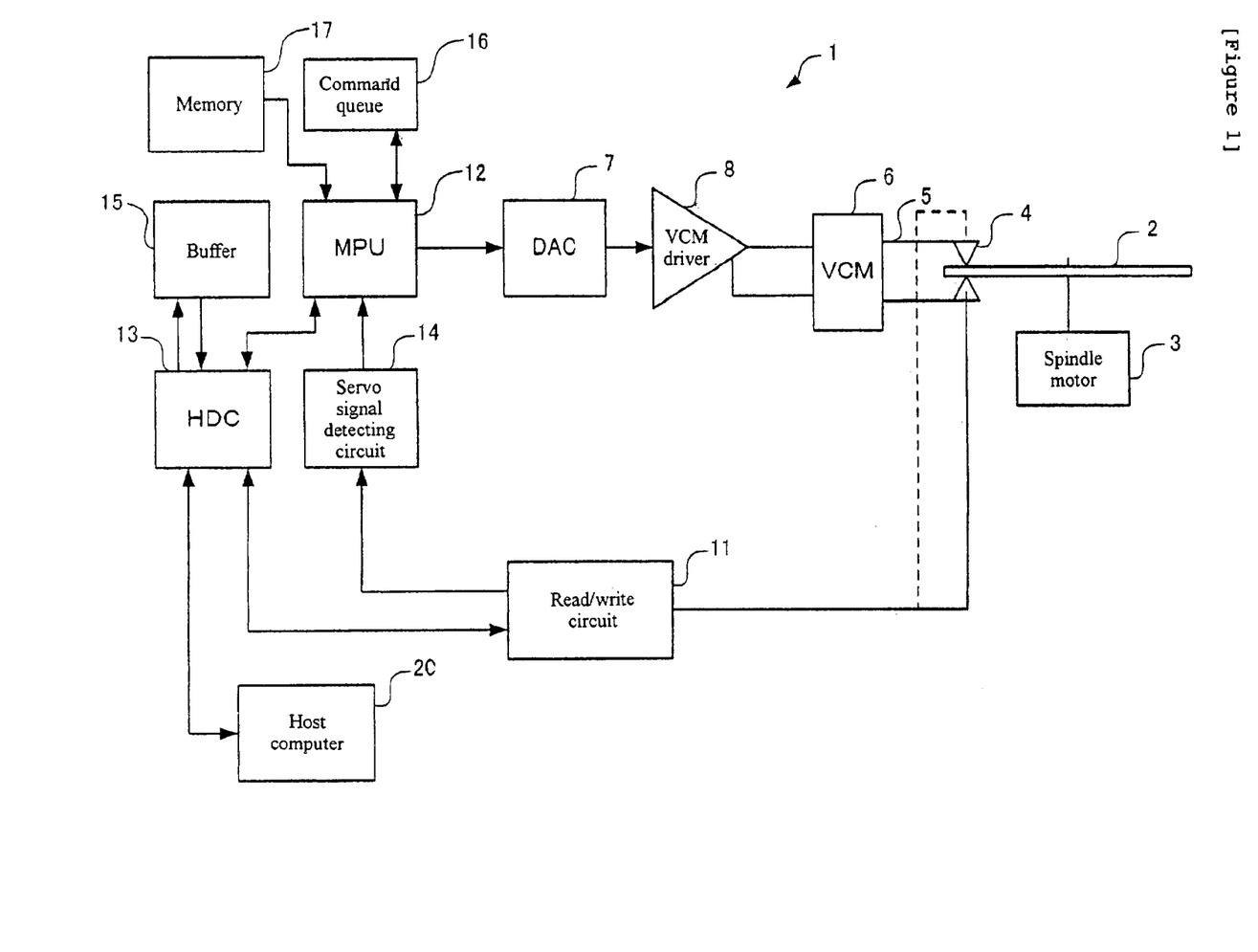
FIG. 1 is a block diagram showing the configuration of a hard disk drive according to an embodiment of the present invention.

With reference now to the Figures, FIG. 1 is a block diagram showing a principal portion of a hard disk drive 1 in this embodiment. The hard disk drive 1 is a data storing/reproducing unit for enabling a magnetic head 4 to seek on a magnetic disk 2 that is driven and rotated by a spindle motor 3 to be located in a predetermined track (position) and write the data into the magnetic disk 2 or read the data written in the magnetic disk 2. One or more magnetic disks 2 are mounted, as needed, but a single magnetic disk 2 is adopted in this embodiment.

The magnetic disk 2 is rotated around a spindle axis of the spindle motor 3, when the hard disk drive 1 is operated, and stopped (still) when the hard disk drive 1 is inactive. A plurality of positional information (servo information) storage areas are formed radially on the surface of the magnetic disk 2 along a radial direction of the disk, and a data storage area is formed in the other region. The location of the magnetic disk 4 can be known by reading the servo information. The servo information is composed of track identification data and burst patterns. The track identification information represents a track address of each data track. The magnetic head 4 reads this track identification information to determine a current track location of the magnetic head 4. A burst pattern consists of a plurality of rows of signal storing regions each having a different phase, which are arranged at a regular interval along a radial direction of the magnetic disk 2. The deviation amount of the magnetic head 4 off the data track can be determined on the basis of a signal output from this burst pattern.

Two magnetic heads 4 corresponding to the front and back faces of the magnetic disk 2 are held at the top end portion of an actuator 5. The magnetic head 4 writes or reads the data into or from the magnetic disk 2. Also, the magnetic head 4 reads the servo information stored in the magnetic disk 2. The magnetic head 4 is moved in the radial direction of the magnetic disk 2 integrally with the actuator 5. A lamp (not shown) for retracting when the magnetic head 4 is not driven is disposed behind the magnetic disk 2.

A read/write circuit 11 performs the data reading/writing process. Namely, the write data transferred via an HDC (Hard Disk Controller) 13 from a host computer 20 is converted into a write signal (electric current) and supplied to the magnetic head 4. The magnetic head 4 writes the data into the magnetic disk 2, on the basis of this write current. On the other hand, a read signal (electric current) read from the magnetic disk 2 is converted into the digital data and output via the HDC 13 to the host computer 20.

A servo signal detecting circuit 14 extracts the servo information from the read data output from the read/write circuit 11. The servo information includes the track identification data and burst patterns, as previously described. The servo information is transferred to an MPU (Micro Processing Unit) 12.

The actuator 5 is driven by a VCM (Voice Coil Motor) 6. Accordingly, it can be said that the VCM 6 drives the magnetic head 4. The VCM 6 is composed of a needle having a coil and a stator having a permanent magnet, in which the needle is driven by supplying a current from a VCM driver 8 to this coil so that the magnetic head 4 is moved to a predetermined location on the magnetic disk 2.

An HDC (Hard Disk Controller) 13 has a function as an interface with the hard disk drive 1. One of the functions is to receive a write command or a read command transferred from the host computer 20 and transfer the received write command or read command to a buffer 15. This write command contains the write data and is hereinafter referred to as the write data appropriately.

The HDC 13 reads the write command or read command temporarily stored in the buffer 15 in accordance with an instruction from the MPU 12 and transfers it to the read/write circuit 11.

A command queue 16 holds the write command stored in the buffer 15, or the order of executing the write command. This order of executing is determined by the MPU 12 and the HDC 13. The write data or read data stored in the buffer 15 is written or read sequentially into or from the magnetic disk 2 in accordance with the executing order held in the command queue 16.

The MPU 12 controls the hard disk drive 1 in cooperation with the HDC 13. The MPU 12 interprets or executes a program stored in a memory 17. This program contains a procedure for re-ordering the command queue 16. Also, the MPU 12 discriminates the location of the magnetic head 4 on the basis of the servo information transferred from the servo signal detecting circuit 14, and generates a positioning control current to the magnetic head 4 on the basis of the distance between the discriminated location of the magnetic head 4 and the target location to output it to a digital/analog converter (DAC) 7.

The DAC 7 converts the positioning control current output from the MPU 12 into an analog signal (voltage signal), and outputs it to the VCM driver 8.

The VCM driver 8 converts the voltage signal received from the DAC 7 into a drive current and supplies it to the VCM 6.

The hard disk drive 1 of this embodiment has a re-ordering method for the command queue 16 with the power save and reduction in acoustic noise, which is effective when the seek time is almost equivalent to or shorter than the rotational latency. The re-ordering method of this embodiment is conventionally well-known regarding the latency. This method is as follows.

First of all, write commands and read commands (hereinafter simply referred to as commands) in the command queue 16 having a depth m are arranged in the order of servo sector number from the data position information (physical head, physical cylinder, physical sector) for commands. Then, with the position information of the last data for commands already selected from the command queue 16 as an origin, the rotational latency of each command in the queue at present time is calculated. And it is determined whether or not its seek is ended within its rotational latency to execute the command in the order from the command having the least rotational latency. If the command is executable, the latency T of that command is equal to its rotational latency. If not executable, the time required for one revolution is added to the rotational latency and the command is transferred to the last of the command queue 16. In the way, when found, the executable command is supposed to be the command with the least latency (that can be sought).

In this embodiment, employing a method for searching for the command having the least latency as described above, n commands are found in the order of commands having shorter latency T. This is made to narrow down the processing objects of the following processes if there are too many commands in the command queue 16. Here, n is a parameter of the natural number equal to or less than the depth m of the command queue 16. Though the above method for searching for the command having the least latency is to find the command having the shortest latency T, the same operation is repeated to extract n commands, such as the command having shorter latency, the command having next shorter latency, and so on.

Then, for the n commands, an evaluation function Fun(L) for the power and acoustic noise is calculated employing the seek distance L, and the latency T is added up to calculate the value of evaluation function Ev to be used for the command selection. And the command having the least value of the evaluation function is selected from the command queue 16 and executed.

$$Ev = A \times T + (1-A) \times Fun(L)$$

Where A is a number from 0 to 1 or a weight parameter that can be set at will by the user. For example, the MPU 12 provides a setting screen for the weight parameter A to the host computer 20. If the weight parameter A is appropriately set up, the command having longer seek distance L is difficult to be selected, so that the power save and reduction in acoustic noise can be made.

Figure 2:
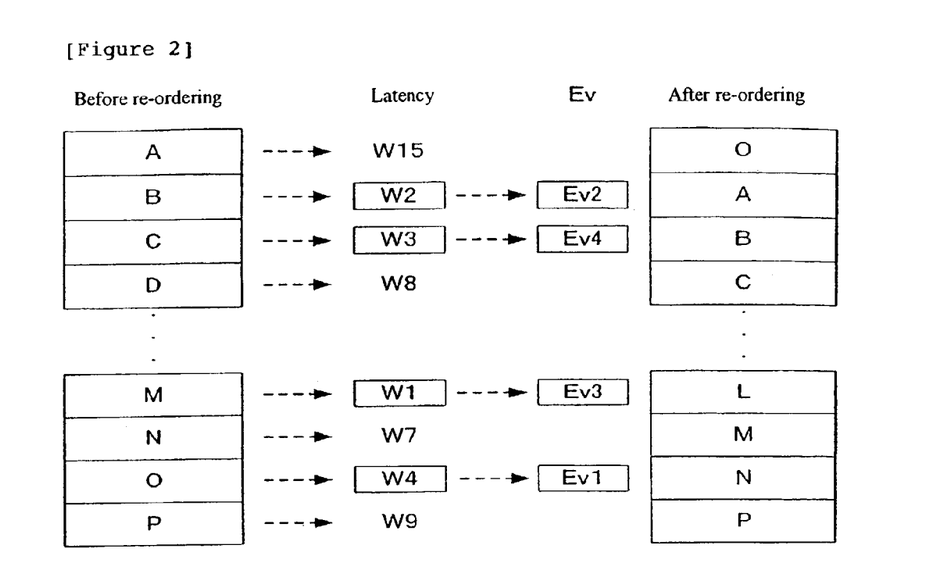
FIG. 2 is a typical diagram showing a re-ordering method according to the embodiment of the invention.

FIG. 2 is a typical diagram showing the re-ordering method described above. In this example, the depth m of the command queue 16 is 16, and the number n of commands to be extracted is 4. It is supposed that the commands A, B, C, D, . . . , M, N, O and P are held in the command queue 16 in this order before re-ordering, as shown in FIG. 2. For the sixteen commands, the latency T is calculated. In FIG. 2, W in a column of latency T denotes the latency, and is suffixed with a smaller number for the shorter latency T. Accordingly, W1 is the shortest latency T, and W15 is the longest latency T. As shown in FIG. 2, since the number n of commands to be extracted is four in this example, the commands M, B, C and O corresponding to W1, W2, W3 and W4 are extracted. For these four commands, the evaluation function Ev is calculated. The results are listed in a column of Ev in FIG. 2. Ev1 is the minimum value. The command O has the smallest Ev value, and the command O is selected as the command to be executed at the next time after re-ordering.

Figure 3:
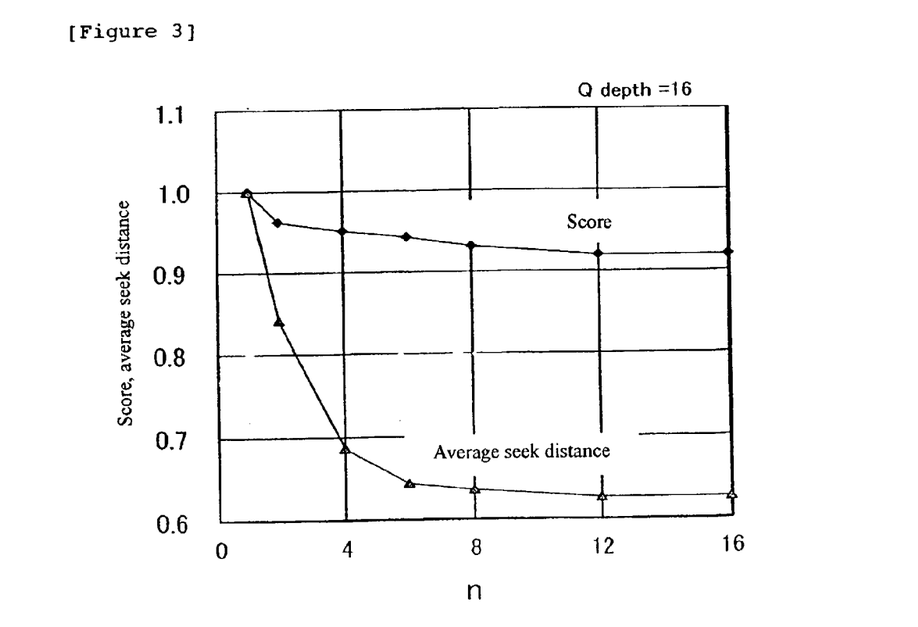
FIG. 3 is a graphical representation showing the relationship between the average score and the average seek distance when the depth of command queue (Queue depth) is 16 in this embodiment (normalized by the values of average score and average seek distance when the average score takes the highest value)

FIG. 3 is a graphical representation showing the relationship between the number n of commands to be extracted and the executing number of commands per unit of time (IO/sec, hereinafter referred to as score) and the average seek distance. These graphs are normalized by the values of average score and average seek distance when the average score takes the maximum value. In FIG. 3, the score and the average seek distance are defined as 1 when n=1. The average seek distance is decreased by about 30% when n=4, and by about 35% when n=8, as shown in FIG. 3. On the other hand, the score is decreased by about 5 to 8% when n=4 to 8. Accordingly, the number n of commands to be extracted is almost equivalent in behavior to the average seek distance that is shorter for n=4 to 8, when the queue depth m of the command queue 16 is equal to 16, as shown in the example of FIG. 3. In this manner, the number n can be obtained in accordance with the operation capacity of the MPU 12 in the hard disk drive 1 and the effect of power save and reduction acoustic noise.

Also, the evaluation function Fun(L) of the power and acoustic noise using the seek distance L may be an increasing function of seek distance L as follows. It is required that this function represents the more or less dependency of power and acoustic noise on the seek distance L.

$$Fun(L) = B \times L; \quad B: \text{constant} \quad (1)$$

$$Fun(L) = B \times (L - C); \quad (\text{case of } L \geq C) \quad (2)$$
$$= 0; \quad (\text{case of } L < C)$$
$$B, C; \text{constants}$$

$$Fun(L) = B \times L^2; \quad B: \text{constant} \quad (3)$$

$$Fun(L) = B \times (L)^{1/2}; \quad B: \text{constant} \quad (4)$$

$$Fun(L) = B \times (L - C)^{1/2}; \quad (\text{case of } L \geq C) \quad (5)$$
$$= 0; \quad (\text{case of } L < C)$$
$$B, C; \text{constants}$$

$$Fun(L) = B \times \text{Seek Time }(L); \quad (6)$$
$$B; \text{constant,}$$
Seek Time $(L)$ is the time taken for the seek distance $L$ In the above discussion and equations, B is a constant for making alignment between the latency T and the seek distance (number of tracks) that are different in unit.

In (2), it is supposed that the acoustic noise can be ignored below a specific seek distance, while the acoustic noise may be conspicuous for the specific seek distance or more. For example, in a case where the acoustic noise can be ignored for the seek distance below 1000 tracks, but can not be ignored for the seek distance of 1000 tracks or more, C is set to 1000 in the expression (2). When the seek distance is below 1000 tracks, the evaluation function Fun(L) becomes zero, so that the re-ordering is made in view of the latency T alone.

In (3), the second power of L is calculated in the evaluation function Fun(L). In this embodiment, in which the command having the minimum Ev is selected, it is effective to make the command having longer seek distance difficult to be selected. This is the evaluation function effective in the case where the power save and reduction in acoustic noise are conspicuous.

In (4) where the square root of seek distance is calculated, the command having longer seek distance is selected, as compared with (1) and (3).

The evaluation function (5) is a combination of (2) and (4), and can be employed in this embodiment.

The evaluation function (6) employs the seek time that is the function of seek distance. The seek time may be used instead of the seek distance in this invention.

Figure 4:
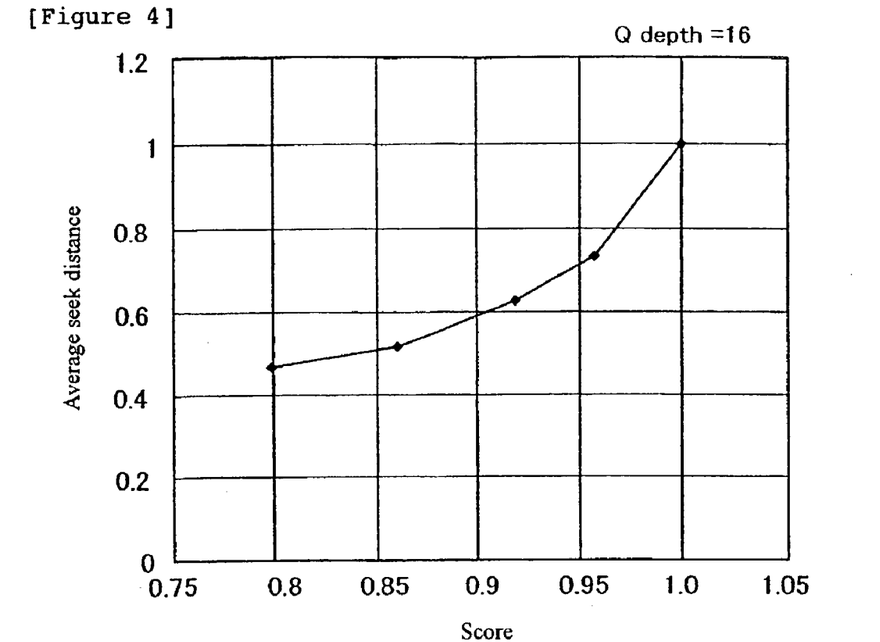
FIG. 4 is a graph showing the result of simulating the relationship between the average score and the average seek distance in this embodiment.
Figure 5:
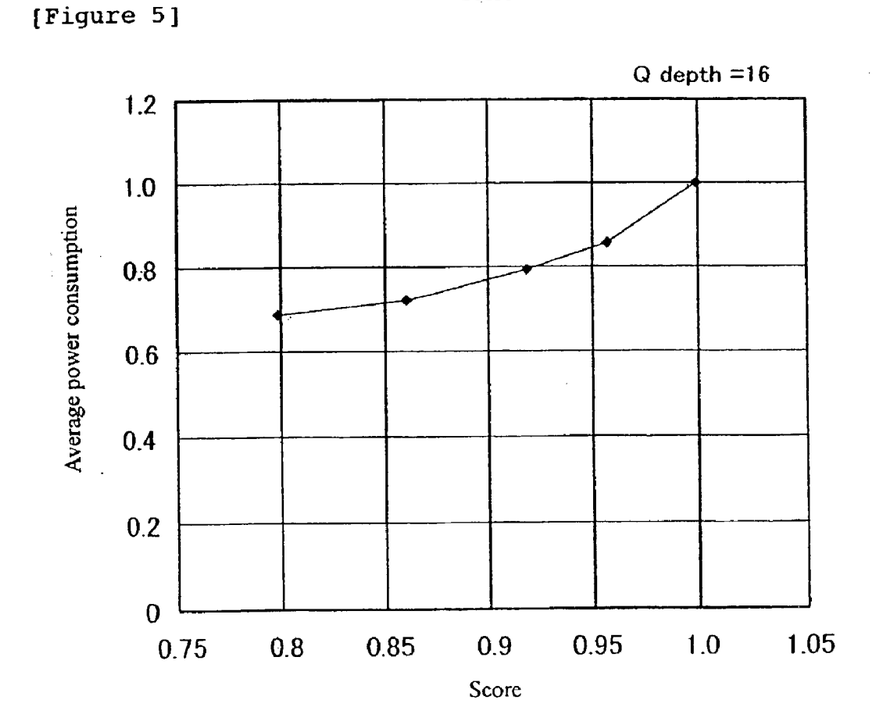
FIG. 5 is a graph showing the result of simulating the relationship between the average score and the power consumption taken for the seek operation in this embodiment.
Figure 6:
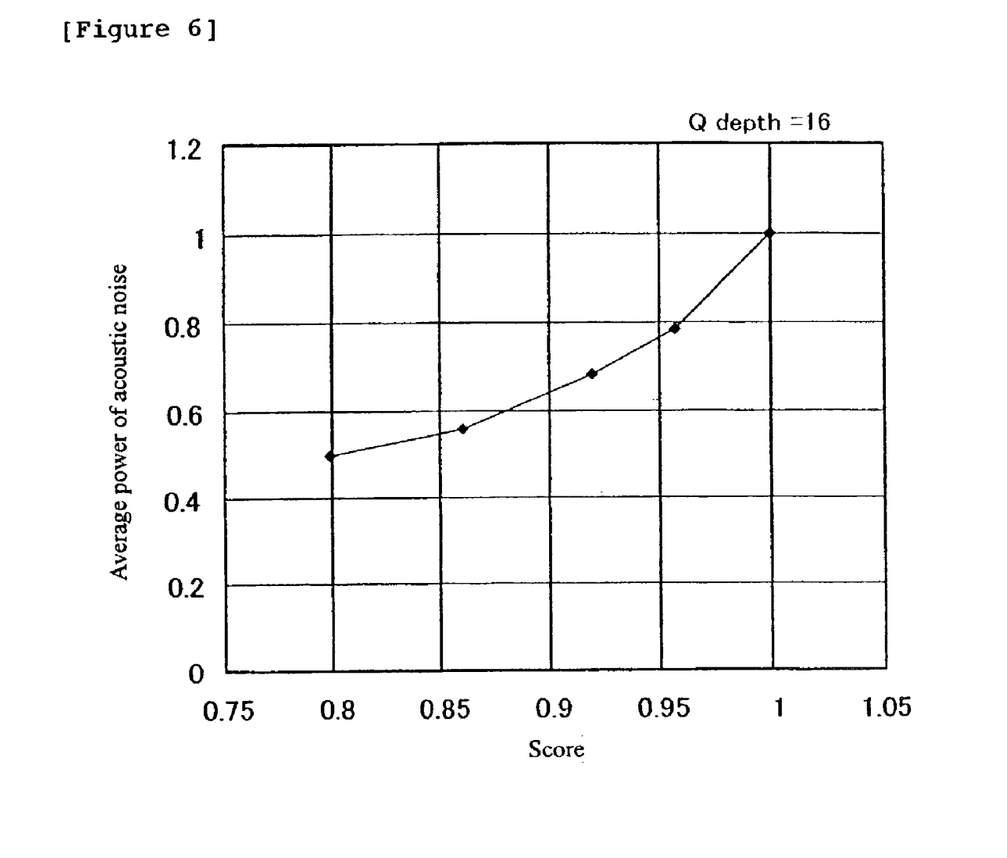
FIG. 6 is a graph showing the result of simulating the relationship between the average score and the power of acoustic noise produced by the seek operation in this embodiment.

FIGS. 4 to 6 are graphs representing the results of simulating the relationship between the score and the average seek distance, or the relationship between the power required for the seek operation and the acoustic noise produced by the seek operation according to this invention.

It is assumed that the depth m of the command queue 16 is equal to 16, and n is equal to 16. In FIGS. 4 to 6, the value 1 occurs with the conventional method, namely, when the re-ordering is made in view of the latency T alone. Also, Fun(L)=10×(L)$^{1/2}$, where unit of L is track.

As shown in FIG. 4, when the score is decreased by 10%, the average seek distance can be reduced by 40%. In FIG. 5, it is indicated that when the score is decreased by 10%, the power taken for seeking can be saved by about 23%. For the acoustic noise, the data storage device is supposed in which the acoustic noise is extremely smaller in seeking for a certain distance L1 (e.g., 1000 tracks) or less. As shown in FIG. 6, when the score is decreased by 10%, the power of acoustic noise produced by the seek can be suppressed by about 35%.

Figure 7:
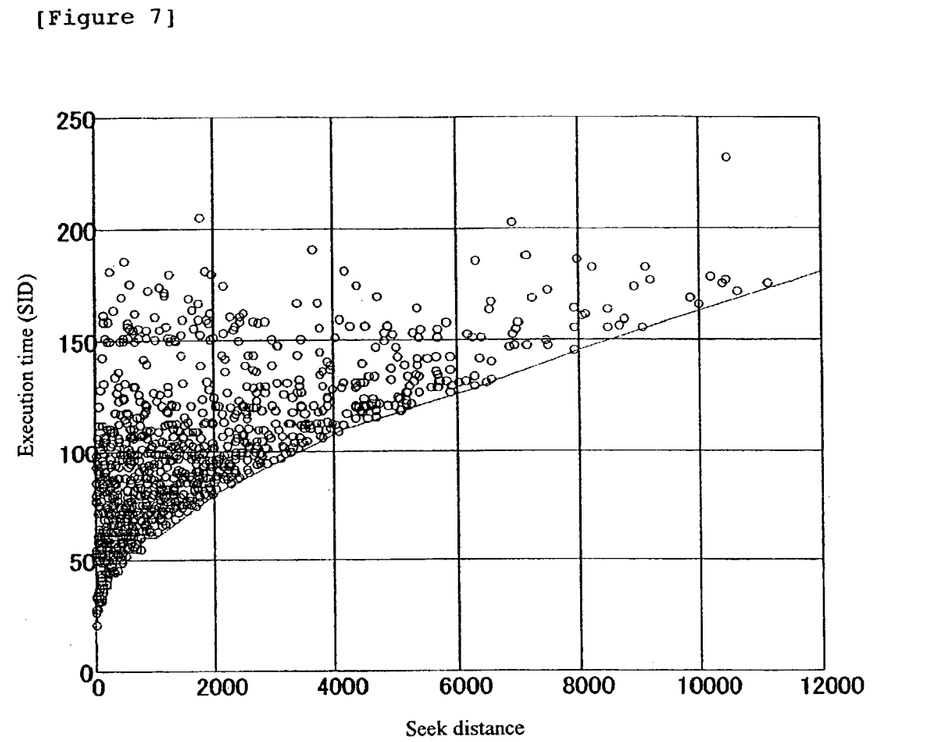
FIG. 7 is a graph showing a command execution time (measured by Servo ID count) and distribution with respect to the seek distance when the score is 1.0.
Figure 8:
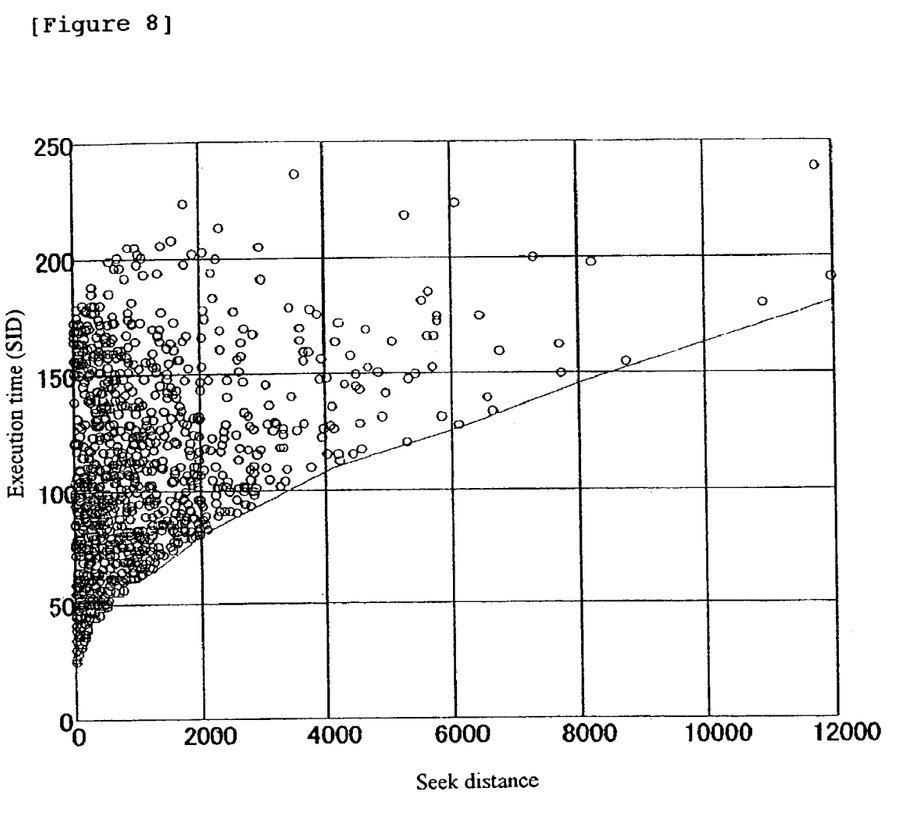
FIG. 8 is a graph showing a command execution time (measured by Servo ID count) and distribution (after re-ordering) with respect to the seek distance when the score is 0.92.
Figure 9:
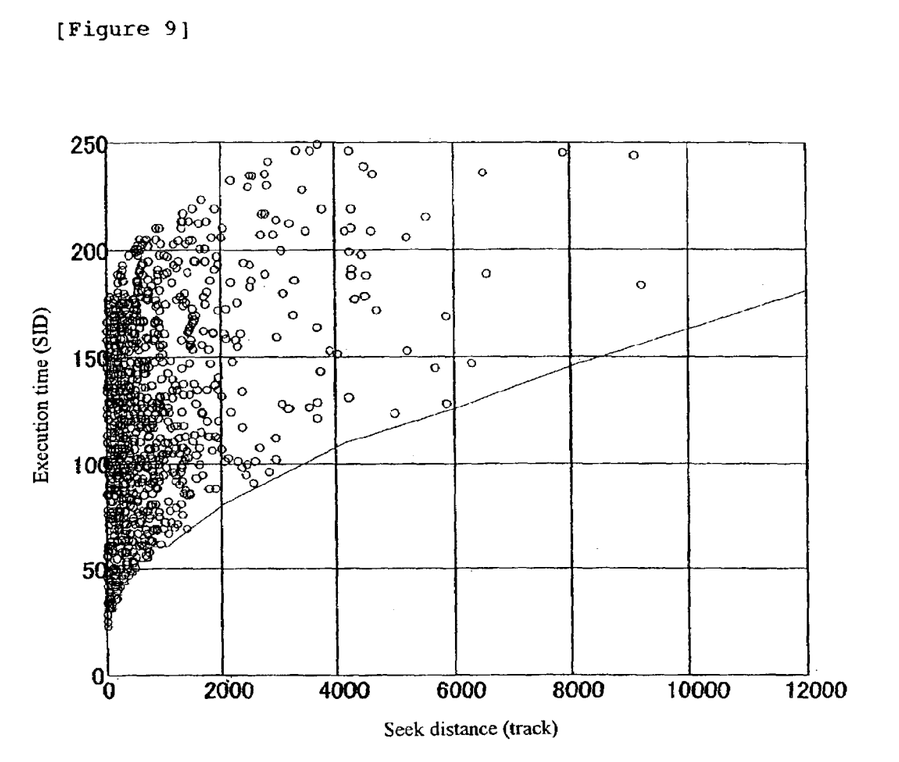
FIG. 9 is a graph showing a command execution time (measured by Servo ID count) and distribution (after re-ordering) with respect to the seek distance when the score is 0.8.

For three cases where the average score (normalized by the maximum value of average score) as shown in FIGS. 4 to 6 is 1.0, 0.92 and 0.8, the command execution time and the seek distance distribution (after re-ordering) are shown in FIGS. 7 to 9. FIGS. 7 to 9 represent the results of executing 1000 commands, in which one point corresponds to one command. A curve in the graph is a profile of seek time. FIG. 7 is a distribution where the score is 1.0 (The parameter A for the evaluation function Ev is set to (1)), FIG. 8 is a distribution where the score is 0.92 (The parameter A for the evaluation function Ev is set to (0.5)), and FIG. 9 is a distribution where the score is 0.8 (The parameter A for the evaluation function Ev is set to (0)). It can be found that the distribution of seek distance is broadest when the score is 1.0 (The parameter A for the evaluation function Ev is set to (1)) (FIG. 7), and narrowest when the score is 0.8 (The parameter A for the evaluation function Ev is set to (0)) (FIG. 9).

Figure 10:
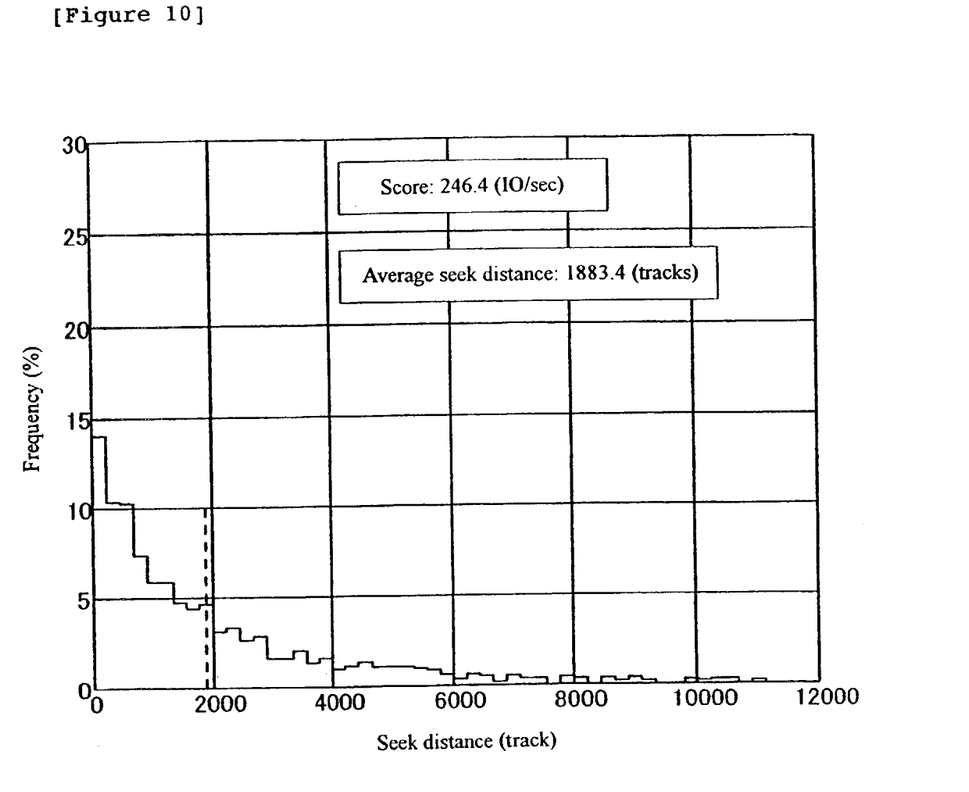
FIG. 10 is a graph showing the frequency of commands executed for each seek distance in the case of FIG. 7.
Figure 11:
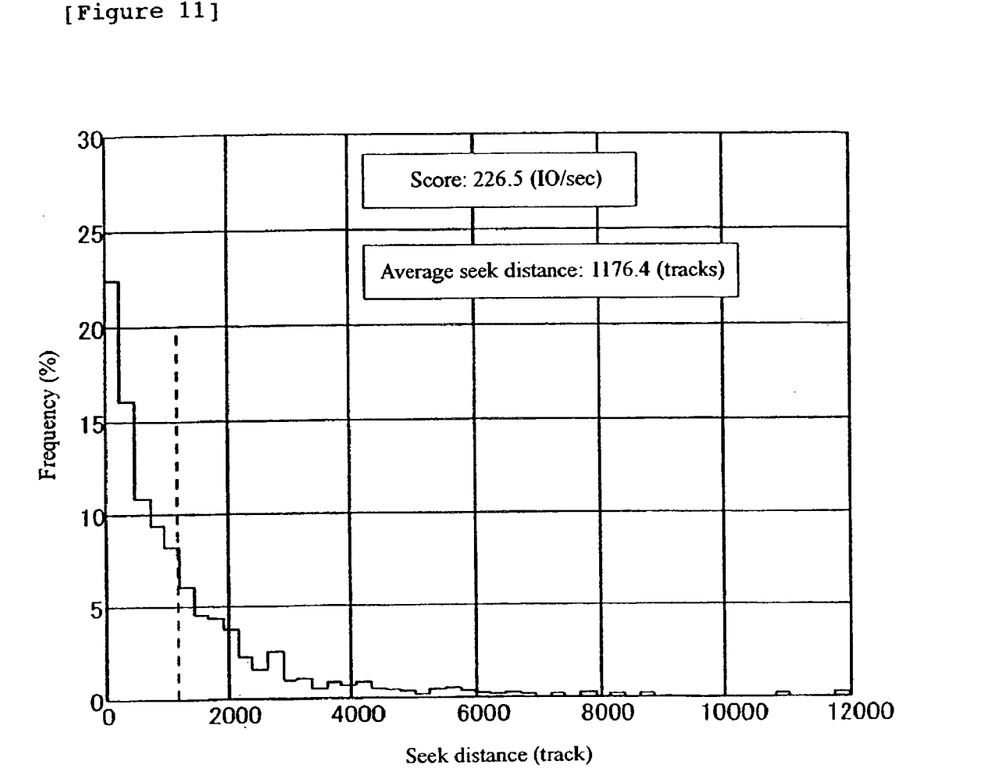
FIG. 11 is a graph showing the frequency of commands executed for each seek distance in the case of FIG. 8.
Figure 12:
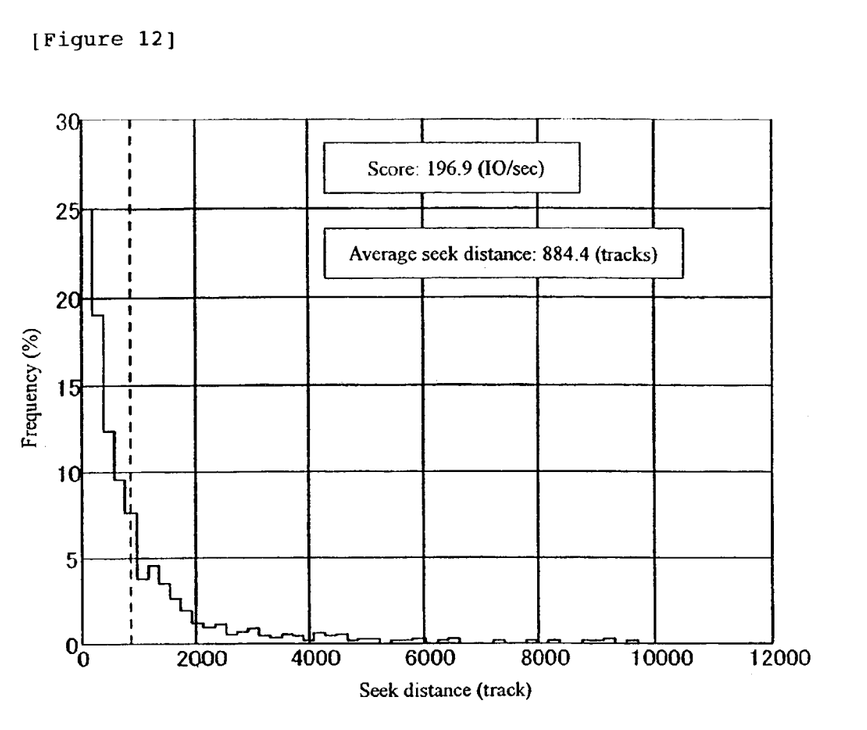
FIG. 12 is a graph showing the frequency of commands executed for each seek distance in the case of FIG. 9.

FIGS. 10 to 12 represent the frequencies of executing the command versus seek distance. FIGS. 10 to 12 are conditional diagrams corresponding to FIGS. 7 to 9. The dotted line drawn vertically in each figure indicates the average seek distance. In FIGS. 11 and 12, the score is lower by 8% and 20%, but the average seek distance is shorter by 40% and 50%, as compared with FIG. 9 (normal). As a result, the power is decreased by 21% and 31%. Also, in the data storage device to which this invention is to be applied, because the acoustic noise is extremely reduced for 1000 tracks or less, the power of acoustic noise can be reduced by 32% and 50% than in the case of FIG. 10 (normal).

A method for changing dynamically a condition from the optimal state of performance to the state with power save and reduction in acoustic noise (or conversely) will be described below.

In a method for measuring the use condition of the hard disk drive 1 of this invention, firstly, the depth of the command queue 16 and the command occupancy rate in the command queue 16 are measured at every few seconds to obtain an average value over a certain period of time (e.g., average value of sixteen measurements).

Herein, it is meant that if the occupancy rate is not 100%, the command is processed earlier than (or at the same time) when the new command is accepted. Also, the performance (number of commands to be processed per second) depends on the number of commands for re-ordering (product between the depth of command queue 16 and the command occupancy rate in the command queue 16), but the command response time (average value) for the user depends on it more strongly. Therefore, if the depth of command queue 16 is identical, the command response time (average time) for the user when the command occupancy rate is held below 100% is shorter than when the occupancy rate is 100%. Namely, for example, if the occupancy rate is held at 90% or more by adjusting the performance (number of commands to be processed per second), the command response time (average time) for the user is not worse than when the command occupancy rate is 100%. When the commands are transferred in succession from the host computer 20, the occupancy rate is generally increased by decreasing the performance, or decreased by increasing the performance, because the command is accepted till the depth of command queue 16. Hence, the occupancy rate can be kept constant by adjusting the performance.

Figure 13:
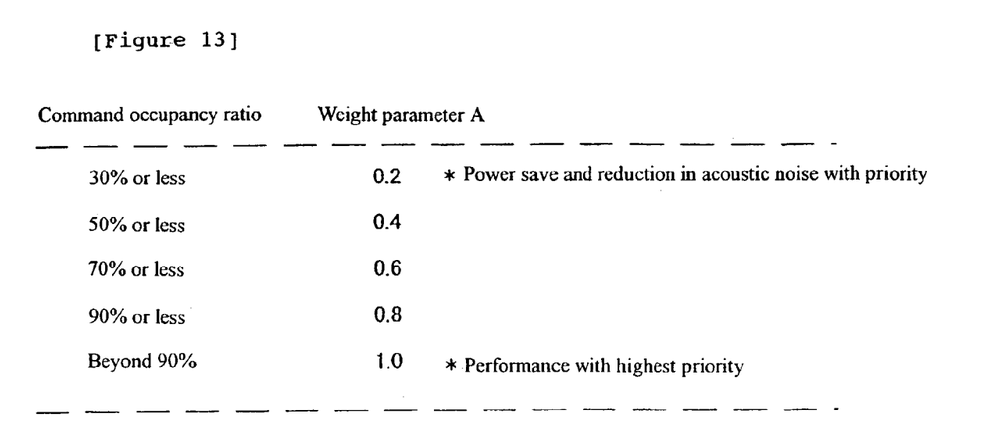
FIG. 13 is a table showing examples of the relationship between the command occupancy rate and the weight parameter A.

Thus, the performance is adjusted employing the weight parameter A for the evaluation function Ev. Specifically, regarding the command occupancy rate and the parameter A, the HDC 13 holds a table as listed in FIG. 13, and dynamically changes the weight parameter A in accordance with the command occupancy rate, on the basis of this table. As shown in FIG. 13, when the command occupancy rate is relatively small, the weight parameter A is set to be relatively small. Conversely, when the command occupancy rate is relatively large, the weight parameter A is set to be relatively large. In this manner, it is possible to change dynamically from the optimal state of performance to the state with power save and reduction in acoustic noise (or conversely) without degrading the mean value of command response time to the user.

As described above, the present invention provides the method for re-ordering the command queue (queue for re-ordering and selecting commands) to make the power save and reduction in acoustic noise. More particularly, the user can select a condition in the range from the optimal state with the highest performance to the optimal state of performance with the power save and reduction in acoustic noise, depending on its service situation and environment. Further, it is possible to change automatically the condition from the optimal state of performance to the state with power save and reduction in acoustic noise (or conversely) without aggravating the command response time to the user.

It should be understood that at least some aspects of the present invention may be implemented in a program product for use with a data storage device. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such single-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

What is claimed is:

1. A data storage device comprising:
   a read/write head;
   a disk storage medium into which data is written and data is read using said read/write head;
   order holding means for holding a writing order of a write command into said disk storage medium, wherein said order holding means further comprises means for holding a reading order of a read command from said disk storage medium; and
   reorder means for reordering said writing order in said order holding means on a basis of a result of applying a predetermined weight on a latency required to execute said write command and a seek distance of said read/write head from a current position of said read/write head from an origin position, wherein said reorder means further comprises means for reordering a reading order in said order holding means on a basis of a result of applying said predetermined weight on a latency required to execute said read command and said seek distance of said read/write head from said current position of said read/write head from said origin position, and wherein said reorder means changes said predetermined weight dynamically on a basis of an occupancy rate of said write command or read command in said order holding means, and wherein a command having a longer seek distance is less likely to be selected for a next execution.

2. The data storage device according to claim 1, further comprising a weighting setting function for allowing a user to set a weighting.

3. The data storage device according to claim 1, wherein said reorder means extracts a predetermined number of commands from among said write command and/or read command held in said order holding means to determine a new writing or reading order for respective said extracted write command and/or read command.

4. The data storage device according to claim 3, wherein said reorder means extracts a predetermined number of commands from among said write command and/or read command held in said order holding means in an order in which said latency is shorter.

5. A command queue re-ordering method for reorder the write commands and/or read commands queued in a command queue of a data storage device having a disk storage medium, comprising:
calculating a value of an evaluation function $Ev=A \times T+(1-A) \times Fun(L)$, wherein A is a value between and including 0 and 1, T is a latency required to execute a write command and/or read command, and Fun(L) is an evaluation function using a seek distance L, for said wnte command and/or read command; and
selecting said write command and/or read command in which said evaluation function Ev is at minimum as a next command to be executed.

6. The command queue re-ordering method according to claim 5, wherein said evaluation function, Fun(L) is an increasing function in which the value increases as the seek distance L is longer.

7. The command queue re-ordering method according to claim 5, wherein said A value increases as an occupancy rate of said write command and/or read command in said command queue increases, and said A value decreases when the occupancy rate of said write command and/or read command in said command queue decreases.

8. A data processing method for executing a read command and/or a write command transferred from a host via a read/write head on a storage medium, said method comprising:
selecting a next read command and/or write command to be executed from among respective read commands and/or write commands on the basis of the result of applying a weight on a latency required to execute said write command or read command from a current position of said read/venire head and a seek distance from the current position of said read/write head, wherein said weight is changed during a data processing;
reading the data from said storage medium or writing the data into said storage medium on the basis of said selected read command and/or write command; and
selecting a next read command and/or write command to be executed by changing said weighting dynamically during the data processing depending on a situation where said read command and/or write command is transferred from the host.

9. A computer-readable medium having a plurality of instructions processable by a machine embodied therein, wherein said plurality of instructions, when processed by said machine causes said machine to perform a method comprising:
holding a writing order of a write command into said disk storage medium, wherein said holding further comprises holding a reading order of a read command from said disk storage medium, and
reordering said writing order on a basis of a result of applying a predetermined weight on a latency required to execute said write command and a seek distance of said read/write head from a current position of said read/write head from an origin position, wherein said reordering changes said predetermined weight dynamically on a basis of an occupancy rate of said write command or read command, and wherein said reordering further comprises reordering a reading order on a basis of a result of applying said predetermined weight on a latency required to execute said read command and said seek distance of said read/write head from said current position of said read/write head from said origin position, and wherein a command having a longer seek distance is less likely to be selected for a next execution.

10. The computer-readable medium of claim 9, wherein the method further comprises:
setting a weighting using a weighting setting function.

11. The computer-readable medium of claim 9, wherein the method further comprises:
extracting a predetermined number of commands from among said write command and/or read command to determine a new writing or reading order for respective said extracted write command and/or said read command.

12. The computer-readable medium of claim 9, wherein the method further comprises:
extracting a predetermined number of commands from among said write command and/or said read command in an order in which said latency is shorter.

* * * * *

UNITED STATES PATENT AND TRADEMARK OFFICE
CERTIFICATE OF CORRECTION

PATENT NO. : 7,010,653 B2  Page 1 of 1
APPLICATION NO. : 10/405523
DATED : March 7, 2006
INVENTOR(S) : Uchida et al.

It is certified that error appears in the above-identified patent and that said Letters Patent is hereby corrected as shown below:

In Claim 5, at column 13, line 28, delete "write" and insert --write--.

Signed and Sealed this

Twelfth Day of September, 2006

JON W. DUDAS
*Director of the United States Patent and Trademark Office*